United States Patent [19]

Northway et al.

[11] Patent Number: 4,585,527
[45] Date of Patent: Apr. 29, 1986

[54] ELECTROLYTIC CELL

[75] Inventors: Herbert S. Northway, Frodsham; Norman Tattam, Chester, both of England

[73] Assignee: Imperial Chemical Industries PLC, London, England

[21] Appl. No.: 695,193

[22] Filed: Jan. 25, 1985

[30] Foreign Application Priority Data

Feb. 3, 1984 [GB] United Kingdom ................ 8402923
Jun. 4, 1984 [GB] United Kingdom ................ 8414200

[51] Int. Cl.$^4$ ................ C25B 1/00; C25B 1/34; C25B 9/00
[52] U.S. Cl. ................ 204/1 R; 204/98; 204/128; 204/244; 204/253; 204/267; 204/279; 277/228; 277/DIG. 6
[58] Field of Search ................ 204/98, 1 R, 128, 242, 204/244, 252, 253, 267, 279; 277/227, 228, DIG. 6

[56] References Cited

U.S. PATENT DOCUMENTS

| | | | |
|---|---|---|---|
| 2,998,374 | 8/1961 | Granfors | 204/279 |
| 3,450,621 | 6/1969 | Anderson | 204/279 |
| 3,671,048 | 6/1972 | Gyory et al. | 277/227 |
| 3,743,592 | 7/1973 | Metcalff | 204/279 |
| 3,794,577 | 2/1974 | Oliver et al. | 204/279 |
| 3,857,775 | 12/1974 | Custer et al. | 204/279 |
| 3,869,375 | 3/1975 | Ono et al. | 204/279 |
| 3,879,044 | 4/1975 | Estes | 277/227 |
| 4,045,323 | 8/1977 | Boggs, Jr. | 204/279 |
| 4,087,343 | 5/1978 | Custer et al. | 204/279 |
| 4,098,670 | 7/1978 | Custer et al. | 204/279 |
| 4,100,053 | 7/1978 | Anderson | 204/279 |
| 4,175,025 | 11/1979 | Creamer et al. | 204/279 |
| 4,207,165 | 6/1980 | Mose et al. | 204/279 |
| 4,243,235 | 1/1981 | Repella | 277/228 |
| 4,268,040 | 5/1981 | Bainard et al. | 277/227 |
| 4,283,263 | 8/1981 | Mirabelli | 204/279 |
| 4,332,661 | 6/1982 | Ford | 204/253 |
| 4,342,460 | 8/1982 | Eng | 204/279 |
| 4,344,633 | 8/1982 | Niksa | 204/279 |
| 4,436,609 | 3/1984 | Sobieniak | 204/279 |
| 4,493,759 | 1/1985 | Boulton et al. | 204/279 |

Primary Examiner—John F. Niebling
Assistant Examiner—Terryence Chapman
Attorney, Agent, or Firm—Cushman, Darby & Cushman

[57] ABSTRACT

An electrolytic cell comprising an anode and cathode and a gasket of an electrically insulating composition in which the gasket is made of an electrically insulating composition which comprises a homogeneous mixture of an elastomeric polymer and at least 15%, and optionally up to 70%, of polytetrafluoroethylene by weight of the composition. Also a gasket suitable for use in an electrolytic cell, and a process of electrolysis which is operated in the electrolytic cell. Aqueous alkali metal chloride solution may be electrolysed in the electrolytic cell.

10 Claims, No Drawings

ELECTROLYTIC CELL

This invention relates to an electrolytic cell, and in particular to an electrolytic cell containing a gasket of a corrosion resistant material, to a gasket for said electrolytic cell, and to a process of electrolysis.

Electrolytic cells are used in many applications. Such cells generally comprise an anode or a plurality of anodes, and a cathode or a plurality of cathodes, and one or more gaskets which, in addition to providing seals in the cell, also provide electrical insulation between the anodes and cathodes. In many such electrolytic cells the electrolyte and/or the products of electrolysis are corrosive, and they may be sufficiently corrosive that the gaskets are chemically attacked, even to the extent that the gaskets may be subjected to substantial errosion and may no longer function satisfactorily as seals such that the electrolyte and/or the products of electrolysis may leak from the cell.

The environment in an electrolytic cell in which aqueous alkali metal chloride solution is electrolysed is an example of a particularly corrosive environment. The aqueous alkali metal chloride solution is itself corrosive, particularly when it contains chlorine, and the products of electrolysis are also corrosive, that is alkali metal chlorate in the case of a chlorate cell, and wet chlorine and alkali metal hydroxide solution in the case of a chlor-alkali cell. In the electrolysis of aqueous alkali metal chloride solution alkali metal hypochlorite may be formed in the solution, particularly during periods of abnormal electrolysis, for example, where the electrolysis is interupted. Such a solution containing alkali metal hypochlorite is particularly corrosive.

The problem of corrosion of gaskets in electrolytic cells is a problem which has been recognised in the art. It is known that fluoropolymeric materials, in particular polytetrafluoroethylene, are resistant to corrosive chemicals, and it is possible to employ gaskets made of such materials in electrolytic cells. However, such materials are expensive and if used in an electrolytic cell the cost of the gaskets becomes a very substantial proportion of the total cost of the electrolytic cell.

It has also been proposed in U.S. Pat. No. 4344633 to employ in an electrolytic cell a so-called multi-layer gasket which comprises an outboard layer of a material having a Type A Shore Scale Durometer Hardness (ASTM Specification No. D-2240-75) of about 40 to 70 and a Compression Set (ASTM Specification D-395-69- Method A) of zero plus to about 40 per cent and an inboard barrier layer of a material which is corrosion resistant, non-contaminating and stable upon contact with chlor-alkali cell electrolyte. The barrier layer may be a polytetrafluoroethylene strip positioned on the membrane facing side of the anode frame of the electrolytic cell and positioned between the anolyte and the gasket. The inboard barrier layer may be a rope or strip of polytetrafluorethylene of the type sold under the tradename "Gore-Tex", and the barrier layer may be separated from or be in contact with the gasket.

In US Pat. No. 4332661 an electrolytic cell is described in which a lubricious material is positioned between a gasket and the adjacent surface of a membrane so that during assembly of the cell the gasket may deform in relation to the membrane and so avoid tearing or otherwise damaging the membrane. The lubricious material may be a thin strip of polytetrafluoroethylene.

In the aforementioned patent there is no suggestion that the strip of lubricious material is bonded to the gasket. Indeed, in order that the strip of lubricious material may permit the gasket to deform during assembly of the electrolytic cell the gasket must be capable of deforming "slidably" against the strip of lubricious material. Furthermore, the strip of lubricious material is not placed in such a position in contact with the gasket as to prevent corrosive liquours from contacting the gasket in the electrolytic cell.

In order to protect a gasket in an electrolytic cell from corrosion by the corrosive liquors with which the gasket may come into contact the gasket, or at least certain parts of the gasket, may have a layer of a corrosion resistant material bonded thereto. Suitable corrosion resistant materials for use in electrolytic cells, and particularly in cells in which aqueous alkali metal chloride solution is electrolysed, are fluoropolymeric materials, particularly polytetrafluoroethylene. However, such materials are well-known for their resistance to bonding. Indeed, in order to bond a strip of polytetrafluoroethylene to an article of organic polymeric material it may be necessary to etch the surface of the polytetrafluoroethylene and then to use an adhesive in order to effect the bonding.

The present invention relates to an electrolytic cell which contains one or more gaskets of an electrically insulating material which gaskets are particularly corrosion resistant and which do not comprise a layer of corrosion resistant material in contact with or bonded to the surface of the gasket.

According to the present invention there is provided an electrolytic cell comprising an anode or a plurality of anodes and a cathode or a plurality of cathodes, and one or more gaskets of an electrically insulating composition, characterised in that the gasket is made at least in part of an electrically insulating composition which comprises a homogeneous mixture of one or more elastomeric polymers and at least 15% of polytetrafluoroethylene by weight of the composition.

Throughout this specification the expression "polytetrafluoroethylene" will be used. Within the scope of this expression there is included polytetrafluoroethylene itself and also copolymers of tetrafluoroethylene with minor proportions of other monomers, for example, ethylene, vinyl chloride or hexafluoropropylene. In general the other monomer or monomers will be present in such a copolymer in a proportion of not more than 15% by weight. For example, the copolymer may comprise tetrafluoroethylene and up to 5%, preferably 0.05 to 20%, by weight of such other monomer or monomers.

The gasket of the invention does not comprise a corrosion-resistant barrier layer and thus, in use, the elastomeric polymer of the gasket comes into contact with the liquors in the cell. It is a surprising feature of the gasket of the invention which contains polytetrafluoroethylene, that, even though the corrosive liquors come into contact with the elastomeric polymer of the gasket, the gasket is much more corrosion resistant than is a gasket of the same elastomeric polymer which does not contain polytetrafluoroethylene.

The composition should be sufficiently electrically insulating when in the form of a gasket that it provides the required electrical insulation in the electrolytic cell.

The composition may be produced by mixing an elastomeric polymer and polytetrafluoroethylene under conditions of high shear. In order to produce a homogeneous composition, that is an intimate mixture of elastomeric polymer and polytetrafluoroethylene, it is necessary to effect the mixing under conditions of high shear. High shear mixing may be achieved in a suitable bladed high shear mixer. However, it is preferred to effect high shear mixing on a twin-roll mill with the rolls rotating at different peripheral speeds, particularly where the composition contains a high proportion of polytetrafluoroethylene. It is a surprising feature of the invention that it is possible, by use of high shear mixing, to produce a homogeneous composition comprising a high proportion of polytetrafluoroethylene by weight of composition, indeed the proportion of polytetrafluoroethylene homogeneously distributed in the composition may be as great as 60% or even 70% of the weight of the composition.

In order to produce the composition by high shear mixing on a twin-roll mill the elastomeric polymer is formed into a band on one of the rolls of the mill and the polymer is passed repeatedly through the nip between the rolls, the width of the nip and the relative peripheral speeds of the rolls being adjusted to achieve high shear. Thereafter, the polytetrafluoroethylene in particulate form is added to the band of elastomeric polymer until the desired proportion of polytetrafluoroethylene has been added. Other components of the composition may be added prior to, during, or after addition of the polytetrafluoroethylene, for example, cross-linking agent or agents which are necessary where curing of the elastomeric polymer is to be effected, and filler materials, that is filler materials other than polytetrafluoroethylene. Such other filler materials are optional.

It is preferred that the extent of shear which is achieved during the mixing process is such as to result in fibrillation of the polytetrafluoroethylene. Where the polytetrafluoroethylene in the composition is in fibrous form it is found that, for a given proportion of polytetrafluoroethylene, the composition has a greater corrosion resistance and dimensional stability when used as a gasket in an electrolytic cell and when contacted with a corrosive environment than is the case where the polytetrafluoroethylene is in particulate form. Whether or not the polytetrafluoroethylene is converted to a fibrous form may be estabilished by examination of the composition by electron micrography.

After production of the homogeneous composition comprising elastomeric polymer, polytetrafluoroethylene, and optionally cross-linking agent or agents and other filler materials, the composition may be shaped, for example by extrusion, by injection moulding, or by compression moulding into any desired shape of gasket and the elastomeric polymer may be cross-linked by reacting the polymer with the cross-linking agent or agents, e.g. by heating the composition.

The gasket is made at least in part of the defined homogeneous composition. The whole of the gasket may be made of the defined composition. Alternatively, the gasket may be made in part of the defined composition and in part of another composition which may be less corrosion resistant than is the defined composition. That part of the gasket which in the electrolytic cell comes into contact with corrosive liquors should be made of the defined homogeneous composition. That part of the gasket which does not come into contact with the corrosive liquors may be made of another composition which may be less corrosion resistant, for example of a composition which comprises the same or a different elastomeric polymer but which does not contain polytetrafluoroethylene.

The elastomeric polymer may be an organic polymer, e.g. a hydrocarbon polymer. For example, it may be natural rubber, polybutadiene, polyisoprene, styrene-butadiene polymer, butyl rubber, an ethylenepropylene copolymer, or an ethylene-propylene-dienecopolymer.

The elastomeric polymer may be a substituted hydrocarbon polymer. For example, it may be a halogen-substituted hydrocarbon polymer, eg. polychloroprene. The substituted hydrocarbon polymer may be a butadiene-acrylonitrile elastomer, that is a nitrile rubber.

The composition may comprise more than one elastomeric polymer.

In the composition from which the gasket is produced the proportion of polytetrafluoroethylene is at least 15% by weight of the composition in order that the polytetrafluoroethylene should confer substantial corrosion resistance to the gasket. It is a surprising feature of the invention that the presence of a proportion of polytetrafluoroethylene as low as 15% by weight confers on a gasket produced from the composition substantial corrosion resistance without the need to cover the surface of the gasket with a corrosion resistant material. As the proportion of polytetrafluoroethylene is increased the corrosion resistance of a gasket produced from the composition increases, and for this reason it is preferred that the composition comprises at least 25%, more preferably at least 40%, by weight of polytetrafluoroethylene. The composition may contain up to 60% or even 70% of polytetrafluoroethylene by weight of the composition. A proportion of polytetrafluoroethylene of at least 40% by weight is preferred where the gasket produced from the composition is to be used in an electrolytic cell in which aqueous alkali metal chloride solution is electrolysed.

Where the elastomeric polymer contains ethylenic unsaturation the cross-linking agent may comprise sulphur and conventional accelerators known in the art. Where the elastomeric polymer does not contain ethylenic unsaturation the cross-linking agent may comprise a peroxide material. Such peroxide materials are known in the art. Peroxide materials may also be used to effect cross-linking of elastomeric polymers which contain ethylenic unsaturation.

The composition may comprise other cross-linking agents known in the art.

The composition from which the gasket is produced may comprise one or more filler materials, especially particulate filler materials, other than polytetra-fluoroethylene. Suitable filler materials include carbon black, and particulate inorganic filler materials, for example silica, titania, and alumina. A filler material will of course be chosen which is not reactive with, or which at most is only slowly reactive with, the corrosive environment with which the composition comes into contact during use as a gasket in an electrolytic cell.

It may be advantageous for the composition to contain such filler material as the proportion of polytetrafluoroethylene which is necessary in the composition in order to achieve a required degree of corrosion resistance in the gasket produced therefrom may be reduced when compared with a composition which does not contain such filler material. However, this may not be the case where the gasket produced from the composition is to be used in an electrolytic cell in which aqueous alkali metal chloride solution is electrolysed.

Filler material may be mixed with the composition prior to, during, or subsequent to addition of the polytetrafluoroethylene to the elastomeric polymer. The filler material is preferably admixed with the elastomeric polymer under conditions of high shear, e.g. on a twin-roll mill.

The electrolytic cell of the invention comprises an anode or a plurality of anodes and a cathode or a plurality of cathodes, and one or more gaskets of the defined composition.

The electrolytic cell may be a monopolar or a bipolar cell.

The electrolytic cell may comprise a separator between each anode and adjacent cathode which divides the cell into separate anode and cathode compartments. The separator may be a hydraulically permeable diaphragm or a substantially hydraulically impermeable ionicallypermselective membrane, particularly a cationicallypermselective membrane. The electrolytic cell will be equipped with means for charging electrolyte to the cell and with means for removing the products of electrolysis from the cell. The electrolysis process may be operated by charging electrolyte to the electrolytic cell, electrolysing the electrolyte therein, and removing the products of electrolysis from the electrolytic cell.

The gasket of the defined composition exhibits a high degree of resistance to corrosion by a variety of different electrolytes and products of electrolysis. However, it shows particular resistance to corrosion when the electrolyte which is electrolysed is an aqueous solution of an alkali metal chloride, for example, an aqueous solution of sodium chloride. Such a solution may be electrolysed in a cell which does not contain a separator between adjacent anodes and cathodes. In this case the products of electrolysis are an aqueous solution of alkali metal chlorate and hydrogen. Alternatively, an aqueous solution of alkali metal chloride may be electrolysed in a cell which comprises a separator between each anode and adjacent cathode.

The gasket of the defined composition is resistant to wet chlorine produced during normal operation of such a cell, and is particularly resistant to corrosion by alkali metal hypochlorite which may be produced in the anode compartments of the cell during abnormal operation of such a cell.

The anode compartments of such a cell are provided with means for feeding aqueous alkali metal chloride electrolyte to the cell, suitably from a common header, and with means for removing products of electrolysis from the cell. Similarly, the cathode compartments of the cell are provided with means for removing products of electrolysis from the cell, and optionally with means for feeding water or other fluid to the cell.

Such electrolytic cells may be of the so-called tank type comprising for example a cathode box having a plurality of foraminate cathode fingers with an anode positioned in the gap between adjacent cathode fingers, the anodes being positioned on a cell base.

The electrolytic cell may be of the filter press type comprising a large number of alternating anodes and cathodes, for example, fifty anodes alternating with fifty cathodes, although the cell may comprise even more anodes and cathodes, for example up to one hundred and fifty alternating anodes and cathodes.

Electrolytic cells of the aforementioned types are used on a large scale for the production of chorine and caustic alkali.

In such an electrolytic cell the separator may be an hydraulically-permeable microporous diaphragm. Where aqueous alkali metal chloride solution is electrolysed in such a cell the solution is charged to the anode compartments of the cell and chlorine produced in the electrolysis is removed therefrom, the solution passes through the diaphragm to the cathode compartments of the cell and hydrogen and aqueous alkali metal hydroxide solution produced by electrolysis are removed therefrom.

In an electrolytic cell equipped with an essentially hydraulically impermeable cationically-permselective membrane aqueous alkali metal chloride solution is charged to the anode compartments of the cell and chlorine produced in the electrolysis and depleted alkali metal chloride solution are removed from the anode compartments, alkali metal ions are transported across the membranes to the cathode compartments of the cell to which water or dilute alkali metal hydroxide solution may be charged, and hydrogen and alkali metal hydroxide solution produced by the reaction of alkali metal ions with hydroxyl ions are removed from the cathode compartments of the cell.

In the electrolytic cell of the invention a gasket of the defined composition may be positioned between the base of a diaphragm cell and the cathode box, and between the cathode box and the cover of the cell of the tank type. In the case of a filter press type cell the gasket may be positioned between adjacent anode and cathodes, or the anodes and cathodes may be positioned within frame-like gaskets of the defined composition.

However, the invention is not limited to application to an electrolytic cell of any particular construction.

The invention is illustrated by reference to the following examples.

EXAMPLE

An elastomeric composition for use in the production of a gasket was produced using the following procedure.

100 parts by weight of ethylene-propylene-diene elastomer was charged to a twin-roll mill the rolls of which operated at differential speeds and the elastomer was formed into a band on one of the rolls of the mill. Thereafter, there was charged to the mill 133 parts by weight of polytetrafluoroethylene powder (Fluon L170, Imperial Chemical Industries PLC), 5 parts by weight of 40% by weight dicumyl peroxide in ethylene-propylene-diene elastomer (Perkadox BC 40A Akzo), 4 parts by weight of dicumyl peroxide (Pekadox BC 14/40A), and 5 parts by weight of zinc oxide, and the resultant elastomer composition was thoroughly mixed on the mill for a period of 20 minutes.

The elastomer composition was extruded into pieces of rectangular cross-section and the pieces were cut to appropriate lengths and charged to a mould for production of a gasket for use in an electrolytic cell.

The gasket was produced by compression moulding the elastomer composition in the mould at a temperature of 160° C. for 20 minutes in order to cure the elastomer and the resultant gasket was removed from the mould and post-cured by heating in an oven at 130° C. for 90 minutes. The resultant gasket, hereinafter referred to as a gasket of Type A, was resilient.

By way of comparison a gasket was produced following the above described procedure except that the elastomer composition from which the gasket was produced comprised 100 parts by weight of ethylene-propylene-diene elastomer, 17 parts by weight of carbon black, 53 parts by weight of aluminium silicate, 9.5 parts of sulphonated rape oil, 5 parts by weight of zinc oxide, 5 parts by weight of Pekadox BC 40A, and 4 parts by weight of Perkadox BC14/40A. The resultant gasket, hereinafter referred to as a gasket of Type B, was resilient.

An electrolytic cell was assembled which incorporated gaskets of Type A and gaskets of Type B. The electrolytic cell comprised a plurality of anodes made of titanium and having a coating of a mixture of $RuO_2$ and $TiO_2$ (35 weight % $RuO_2$ and 65 weight % of $TiO_2$) and a plurality of nickel cathodes.

In the electrolytic cell each anode was separated from an adjacent cathode by a cation permselective membrane (Flemion, Asahi Glass Col Ltd.). Anode and cathode compartment spaces were formed respectively by positioning a gasket between each membrane and adjacent anode and a gasket between each membrane and adjacent cathode. An aqueous sodium chloride solution was charged to the anode compartments of the electrolytic cell and water to the cathode compartments, the solution was electrolysed, and the products were removed therefrom, chlorine and depleted sodium chloride solution from the anode compartments and hydrogen and aqueous sodium hydroxide solution from the cathode compartments. In order that the gaskets may be subjected to an accelerated corrosion test a portion of the sodium hydroxide solution produced in the cathode compartments was fed to the anode compartments in which it reacted with chlorine to produce sodium hypochlorite which is particularly corrosive to gaskets in electrolytic cells in which aqueous sodium chloride solution is electrolysed.

Electrolysis was effected under the following conditions over a continuous period of 47 days.

Concentration of sodium chloride in solution charged to anode compartments—305 g/1 (exit concentration—235 g/1).

Concentration of sodium hydroxide in cathode compartments—33 weight %.

Temperature—83° C.

Anode current density—1.8 kA/m$^2$.

Concentration of sodium hypochlorite in anode compartments—5 g/1.

After 47 days electrolysis the electrolytic cell was dismantled and those gaskets which had been in contact with the solution in the anode compartments of the cell were examined.

Gaskets of Type A were found to have been eroded to a depth varying between ½ and ¾ mm, whereas, by way of contrast, gaskets of Type B were found to be severely corroded having been eroded to a depth of approximately 3mm.

We claim:

1. An electrolytic cell comprising an anode or a plurality of anodes and a cathode or a plurality of cathodes, and one or more gaskets of an electrically insulating composition, characterised in that the gasket is made at least in part of an electrically insulating composition which comprises a homogeneous mixture of one or more elastomeric polymers and at least 15% of polytetrafluoroethylene by weight of the composition.

2. An electrolytic cell as claimed in claim 1 characterised in that the whole of the gasket is made of an electrically insulating composition which comprises a homogeneous mixture of one or more elastomeric polymers and at least 15% of polytetrafluoroethylene by weight of the composition.

3. An electrolytic cell as claimed in claim 1 characterised in that the elastomeric polymer in the composition of the gasket comprises a hydrocarbon polymer and/or a substituted hydrocarbon polymer.

4. An electrolytic cell as claimed in claim 3 characterised in that the elastomeric polymer is an ethylene-propylene-diene copolymer.

5. An electrolytic cell as claimed in claim 1 characterised in that the electrically-insulating composition of the gasket comprises at least 25% of polytetrafluoroethylene by weight of the composition.

6. An electrolytic cell as claimed in claim 1 characterised in that the electrically-insulating composition of the gasket comprises up to 70% of polytetrafluoroethylene by weight of the composition.

7. An electrolytic cell as claimed in claim 1 characterised in that the cell comprises a separator between each anode and adjacent cathode.

8. A process of electrolysis which comprises charging an electrolyte to an electrolytic cell, electrolysing the electrolyte in the electrolytic cell, and removing the products of electrolysis from the electrolytic cell, characterised in that the electrolytic cell is an electrolytic cell as claimed in claim 1.

9. A process of electrolysis as claimed in claim 8 characterised in that the electrolyte is an aqueous solution of an alkali metal chloride.

10. A process of electrolysis as claimed in claim 9 characterised in that the electrolytic cell comprises a separator between each anode and adjacent cathode and in that the products of electrolysis include chlorine and an aqueous solution containing an alkali metal hydroxide.

* * * * *